United States Patent
Mitchell et al.

(10) Patent No.: US 10,704,693 B2
(45) Date of Patent: Jul. 7, 2020

(54) CRYOGENIC FERROFLUID SEALED ROTARY UNION

(71) Applicant: Varian Semiconductor Equipment Associates, Inc., Gloucester, MA (US)

(72) Inventors: Robert Mitchell, Winchester, MA (US); Roger B. Fish, Bedford, MA (US); Shardul S. Patel, Chelmsford, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 126 days.

(21) Appl. No.: 15/941,096

(22) Filed: Mar. 30, 2018

(65) Prior Publication Data

US 2019/0301616 A1 Oct. 3, 2019

(51) Int. Cl.
*F16J 15/43* (2006.01)
*F16L 27/08* (2006.01)

(52) U.S. Cl.
CPC ........... *F16J 15/43* (2013.01); *F16L 27/0828* (2013.01); *F17C 2227/00* (2013.01); *F17C 2270/0518* (2013.01)

(58) Field of Classification Search
CPC .... F16J 15/40; F16J 15/43; F16J 15/54; F16L 27/2828; F17C 2227/00; F17C 2270/0518
See application file for complete search history.

(56) References Cited

U.S. PATENT DOCUMENTS

| 7,816,826 B2* | 10/2010 | Gromoll | H02K 55/04 310/52 |
| 2004/0045670 A1* | 3/2004 | Tepman | H01J 37/3405 156/345.37 |
| 2005/0088048 A1* | 4/2005 | Frank | F28D 15/0266 310/61 |
| 2005/0127765 A1* | 6/2005 | Kummeth | F16C 32/0438 310/90.5 |
| 2005/0155356 A1* | 7/2005 | Frank | F25D 19/006 62/6 |

(Continued)

FOREIGN PATENT DOCUMENTS

| JP | 2006-179629 A | 7/2006 |
| KR | 10-2017-0014775 A | 2/2017 |

OTHER PUBLICATIONS

International Search Report and Written Opinion dated Jun. 4, 2019 in corresponding PCT application No. PCT/US2019/018886.

(Continued)

*Primary Examiner* — Gilbert Y Lee
(74) *Attorney, Agent, or Firm* — Nields, Lemack & Frame, LLC

(57) ABSTRACT

A rotary union that includes a heated ferrofluid seal is disclosed. The rotary union includes an inner rotating shaft, an intermediate rotating shaft and an outer rotating shaft. The inner rotating shaft is hollow to allow the flow of cryogenic fluid in one direction. The inner rotating shaft and the intermediate shaft are spaced apart to create a channel for the return of the cryogenic fluid. The intermediate rotating shaft is separated from the outer rotating shaft by a gap so as to reduce thermal conductivity. In this way, the temperature of the outer rotating shaft is greater than the temperature of the cryogenic fluid. A heated ferrofluid seal is disposed between the outer rotating shaft and the housing.

18 Claims, 5 Drawing Sheets

(56) References Cited

U.S. PATENT DOCUMENTS

2006/0158059 A1* 7/2006 Steinmeyer ............ H02K 9/00
                                                    310/261.1
2011/0291023 A1   12/2011 Lee et al.
2015/0075431 A1    3/2015 Barriss et al.
2017/0221682 A1    8/2017 Nishimura et al.

OTHER PUBLICATIONS

"Cryogenic Liquid Operational Seal Enhanced Rotary Union, Navy SBIR FY2010.1", Navy Small Business Innovation Research, http://www.navysbir.com/10_1/252.htm, 2010.
"Cryogenic Liquid Operational Seal Enhanced Rotary Union, Award Information", Navy Small Business Innovation Research, Phase I, https://www.sbir.gov/sbirsearch/detail/8787, 2010.
"Cryogenic Liquid Operational Seal Enhanced Rotary Union, Award Information", Navy Small Business Innovation Research, Phase II, https://www.sbir.gov/node/397403, 2012.

* cited by examiner

CRYOGENIC FERROFLUID SEALED ROTARY UNION

FIELD

Embodiments of the present disclosure relate to ferrofluid sealed rotary unions, and more particularly, ferrofluid sealed rotary unions used to provide cryogenic fluid to a process chamber.

BACKGROUND

In some workpiece processing systems, the workpiece is disposed on a platen, which can be rotated. This platen may also include electrical components, such as electrodes that are in communication with a power source. Additionally, this platen may have fluid conduits to allow a fluid to pass therethrough to heat or cool the platen. These fluid conduits are in communication with an external fluid source and an external fluid sink. Because the platen rotates, a rotary union is typically used to link the platen to the external components. The rotary union provides the electrical connections, as well as fluid inlets and fluid outlets. In some embodiments, the electrical connections may be integrated, while in other embodiments, a separate electrical rotary union may be employed. Further, typically, one end of the rotary union is disposed in a process chamber, which is maintained at very low pressure, while the other side is disposed at atmospheric conditions.

The workpiece may be a semiconductor wafer, which is subjected to one or more processes while disposed on the platen. These processes may include etching, deposition and ion implantation.

In some particular embodiments, the platen is cooled to cold temperatures to enhance the process being performed on the workpiece. This may be achieved by passing a cold fluid through the fluid conduits in the platen. However, seals used in conventional rotary unions often fail to seal at cryogenic temperatures. For example, leakage may result from a shrinkage of the seal due to temperature changes, from the seal becoming brittle or less compliant due to the low temperatures, or due to other reasons. Consequently, the minimum workpiece temperature that can be attained may be based on the ability of the rotary union to continue functioning properly. In other embodiments where cryogenic temperatures are used, the rotary union may be replaced with stationary conduits, such that the platen is incapable of rotation.

Consequently, it would be beneficial if there was a rotary union that could withstand these extremely low temperatures without failing. Such a rotary union would make it possible to perform cryogenic processing of the workpiece using a rotating platen.

SUMMARY

A rotary union that includes a heated ferrofluid seal is disclosed. The rotary union includes an inner rotating shaft, an intermediate rotating shaft and an outer rotating shaft. The inner rotating shaft is hollow to allow the flow of cryogenic fluid in one direction. The inner rotating shaft and the intermediate shaft are spaced apart to create a channel for the return of the cryogenic fluid. The intermediate rotating shaft is separated from the outer rotating shaft by a gap so as to reduce thermal conductivity. In this way, the temperature of the outer rotating shaft is greater than the temperature of the cryogenic fluid. A heated ferrofluid seal is disposed between the outer rotating shaft and the housing. The ferrofluid seal may be heated using a resistive heater, a heated gas or a heated fluid.

According to one embodiment, a rotary union for carrying a cryogenic fluid is disclosed. The rotary union comprises a hollow inner rotating shaft; an intermediate rotating shaft surrounding the hollow inner rotating shaft, where a channel is created in a space between the hollow inner rotating shaft and the intermediate rotating shaft; an outer rotating shaft surrounding the intermediate rotating shaft, and separated from the intermediate rotating shaft by a gap; a housing surrounding the outer rotating shaft; a ferrofluid seal disposed between the outer rotating shaft and the housing; and a heater proximate the housing to warm the ferrofluid seal. In certain embodiments, the rotary union comprises a static seal between the intermediate rotating shaft and the outer rotating shaft. In some embodiments, the static seal hermetically seals the intermediate rotating shaft and the outer rotating shaft. In certain embodiments, the static seal comprises a ceramic ring that is brazed to the outer rotating shaft and the intermediate rotating shaft. In other embodiments, the static seal comprises a bellows. In certain embodiments, the heater comprises a resistive element. In other embodiments, a heating channel is disposed within the housing and wherein a heated fluid passes through the heating channel, wherein the heating channel and the heated fluid comprise the heater. In some embodiments, the rotary union is disposed in an isolation box, maintained at near vacuum conditions, and the gap is maintained at the near vacuum conditions.

According to another embodiment, a workpiece processing system is disclosed. The system comprises a process chamber, maintained at near vacuum conditions; a rotating platen within the process chamber, on which a workpiece is disposed; a rotating shaft assembly having an upper hollow inner shaft and return path for cryogenic fluid, wherein the upper hollow inner shaft and the return path are in communication with a conduit in the rotating platen; an isolation box having an inlet and an outlet and maintained at near vacuum conditions; a rotary union disposed within the isolation box, the rotary union comprising a lower hollow inner shaft to deliver cryogenic fluid to the rotating platen and a lower intermediate shaft spaced apart from the lower hollow inner shaft defining a channel therebetween that is in communication with the return path; a base disposed in the isolation box, having an inlet conduit in communication with the inlet and the lower hollow inner shaft, and an outlet conduit in communication with the outlet and the channel; and a heated ferrofluid seal to isolate the outlet conduit from the near vacuum conditions within the isolation box. In certain embodiments, the rotary union further comprises a lower outer shaft spaced apart from the lower intermediate shaft by a gap, wherein the gap is hermetically sealed proximate the base so that the gap is maintained at near vacuum conditions. In certain further embodiments, the rotary union further comprises a lower housing surrounding the lower outer shaft, wherein the lower housing is stationary and the heated ferrofluid seal is disposed between the lower outer shaft and the lower housing. In some embodiments, a resistive heater is disposed proximate the lower housing. In certain embodiments, a heating channel is disposed in the lower housing through which a heated fluid passes. In certain embodiments, the upper hollow inner shaft and the lower hollow inner shaft comprise one shaft.

According to another embodiment, a rotary union for carrying a cryogenic fluid is disclosed. The rotary union comprises a hollow inner rotating shaft; an intermediate rotating shaft surrounding the hollow inner rotating shaft, where a channel is created in a space between the hollow inner rotating shaft and the intermediate rotating shaft, where the channel terminates in a cavity; an outer rotating shaft surrounding the intermediate rotating shaft, and separated from the intermediate rotating shaft by a gap; a static seal to hermetically seal the gap from the cavity; a housing surrounding the outer rotating shaft; a ferrofluid seal disposed between the outer rotating shaft and the housing to seal the cavity; a heater proximate the housing to warm the ferrofluid seal; a base, having an inlet conduit in communication with the hollow inner rotating shaft, and an outlet conduit in communication with the cavity. In certain embodiments, an insulator is disposed against a bottom surface of the intermediate rotating shaft, a bottom surface of the outer rotating shaft, and a bottom surface of the housing, and is disposed between the housing and the base. In some embodiments, the static seal comprises a ceramic ring that is brazed to the outer rotating shaft and the intermediate rotating shaft. In other embodiments, the static seal comprises a bellows.

BRIEF DESCRIPTION OF THE FIGURES

For a better understanding of the present disclosure, reference is made to the accompanying drawings, which are incorporated herein by reference and in which.

DETAILED DESCRIPTION

As described above, in certain systems, it is desirable to have a workpiece processed at very low temperatures, while disposed on a rotating platen.

Figure 1:
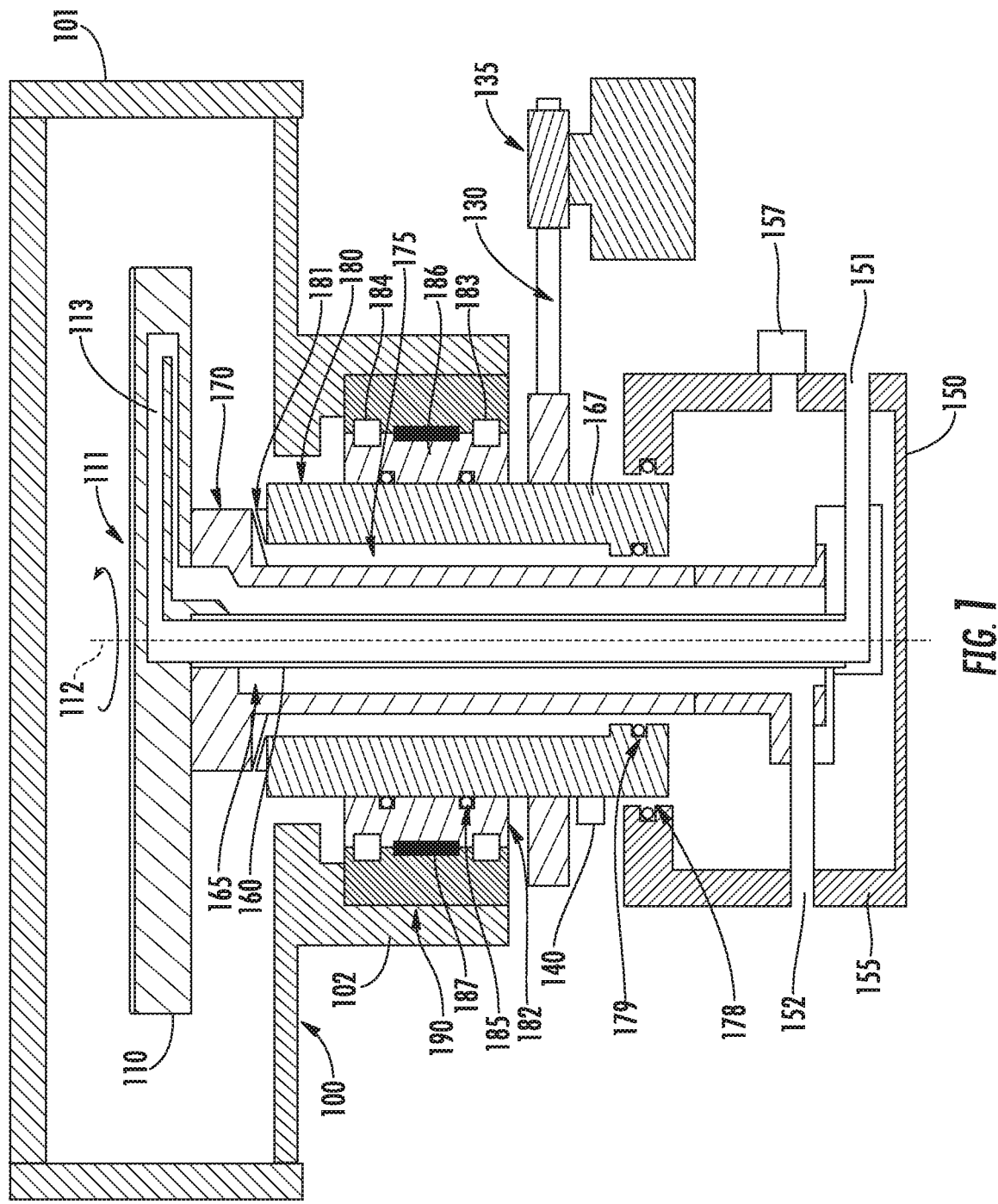
FIG. 1 is a view of a workpiece processing system that utilizes the ferrofluid cryogenic rotary union according to one embodiment.

FIG. 1 shows a system that addresses this issue. The system includes a process chamber 100, which comprises a plurality of walls 101 that define a sealed chamber, which is maintained at near vacuum conditions. In this disclosure, the term "near vacuum conditions" refers to a pressure of less than 50 millitorr. In some embodiments, an ion source may also be in communication with the process chamber 100. In other embodiments, one or more components may be disposed between the ion source and the process chamber 100. The type of processing defines the configuration. In one particular embodiment, the process is PVD (Physical Vapor Deposition). In this embodiment, gases are introduced into the process chamber 100 to form a film on the workpiece 111. In another embodiment, the workpiece 111 may be subjected to an ion implantation where either a beamline system or a plasma source is in communication with the process chamber 100. For example, a beam-line ion implantation system may have a mass analyzer, one or more acceleration/deceleration stages and a collimator disposed between the ion source and the process chamber 100. In another embodiment, the workpiece 111 may be subjected to an etch process. In an etch process, a source of RF energy is typically placed above the workpiece 111 and the platen 110 may be electrically biased. Thus, the location of the ion or plasma source relative to the process chamber 100 is not limited by this disclosure.

In these embodiments, the platen 110 may be disposed in the process chamber 100. A workpiece 111 may be disposed on the platen 110. The platen 110 is rigidly attached to an upper inner shaft 160 and the upper intermediate shaft 170. The upper inner shaft 160 is hollow. This enables the platen 110 to rotate about axis 112. An upper outer shaft 180 may also enter the process chamber 100. The upper inner shaft 160 and the upper intermediate shaft 170 are separated by a channel 165. The upper outer shaft 180 is separated from the upper intermediate shaft 170 by a gap 175. The configuration of the upper inner shaft 160, the upper intermediate shaft 170 and the upper outer shaft 180 may be referred to as the rotating shaft assembly 167, as all three of these shafts rotate about axis 112. These three shafts are concentric. A support 181 may be disposed between the upper outer shaft 180 and the upper intermediate shaft 170 near the upper end of the upper outer shaft 180. The support 181 may mechanically support the upper outer shaft 180 and help maintain the gap 175. Further, the support 181 may be thermally insulating to minimize the transfer of heat between the upper intermediate shaft 170 and the upper outer shaft 180. Additionally, the support 181 may have openings such that the gap 175 is part of the atmosphere of the process chamber 100. In this way, the gap 175 may also be maintained at near vacuum conditions.

The process chamber 100 may also have a port 102 to which an upper housing 190 is attached. A seal is created between the upper housing 190 and the upper outer shaft 180 using an upper ferrofluid seal 182. The upper ferrofluid seal 182 serves to isolate the environment within the process chamber 100 from the outside atmosphere. The upper ferrofluid seal 182 includes an inner shaft 186 supported by the bearings 183, 184. The inner shaft 186 of the upper ferrofluid seal 182 supports the upper outer shaft 180, such as via use of a flange. Further, the static seals 185 seal the gap between the inner shaft 186 of the upper ferrofluid seal 182 and the upper outer shaft 180 as these components rotate together. The pair of static seals 185 shown serve to decrease potential leaks. The ferrofluid 187 in the upper ferrofluid seal 182 is disposed between bearings 183, 184. The rotating shaft assembly 167 may be rotated using any suitable means. For example, the rotating shaft assembly 167 may be moved by connection to a drive timing belt 130. The drive timing belt 130 may be in communication with a motor 135. In other embodiments, the rotating shaft assembly 167 may be directly driven. For example, direct drive where the motor's magnetic field drives the rotating shaft assembly 167 and the rotor could also be used. Thus, the mechanism used to cause the rotation of the rotating shaft assembly 167 is not limited by this disclosure. An electrical slip ring assembly 140 may also be disposed on the rotating shaft assembly 167. The electrical slip ring assembly 140 may comprise one or more slip rings that allow electrical connection between a stationary object and a rotating object, such as the rotating shaft assembly 167. The number of slip rings is not limited by this disclosure. In other embodiments, the electrical slip ring assembly 140 may not be employed, or may be a separate rotary union.

The rotating shaft assembly 167 terminates in an isolation box 150. The isolation box 150 includes a housing 155 having the inlet 151 and the outlet 152 for the cryogenic fluid. The cryogenic fluid may be a gas. The hollow center of the upper inner shaft 160 is in fluid communication with the inlet 151, while the channel 165 is in fluid communication with the outlet 152.

A static seal 179 may be used to isolate the environment in the process chamber 100 (i.e. gap 175) from the environment in the isolation box 150. In certain embodiments, the static seal 179 may also serve to affix the upper outer shaft 180 to the upper intermediate shaft 170. In other embodiments, support 181 serves as both an insulator and a mechanical support, while static seal 179 only acts as a sealing device. Dynamic seals 178 are used to isolate the environment within the isolation box 150 from the atmospheric pressure outside the isolation box 150. These dynamic seals 178 may be spring loaded Teflon type seals, O-rings or any other suitable sealing device. In some embodiments, the interior of the isolation box 150 may be kept at sub-atmospheric pressures, such as in the millitorr range. In certain embodiments, the pressure within the isolation box 150 may be 50 millitorr or less. The interior of the isolation box 150 may be continually pumped to sustain the vacuum levels low enough to minimize heat transfer using a vacuum pump 157. The vacuum pump 157 also removes any gases that leak through the rotary union and are not intended to enter the process chamber 100. By removing air and other gasses from the isolation box 150, the likelihood of icing on cold components within the isolation box 150 is significantly reduced.

Figure 2:
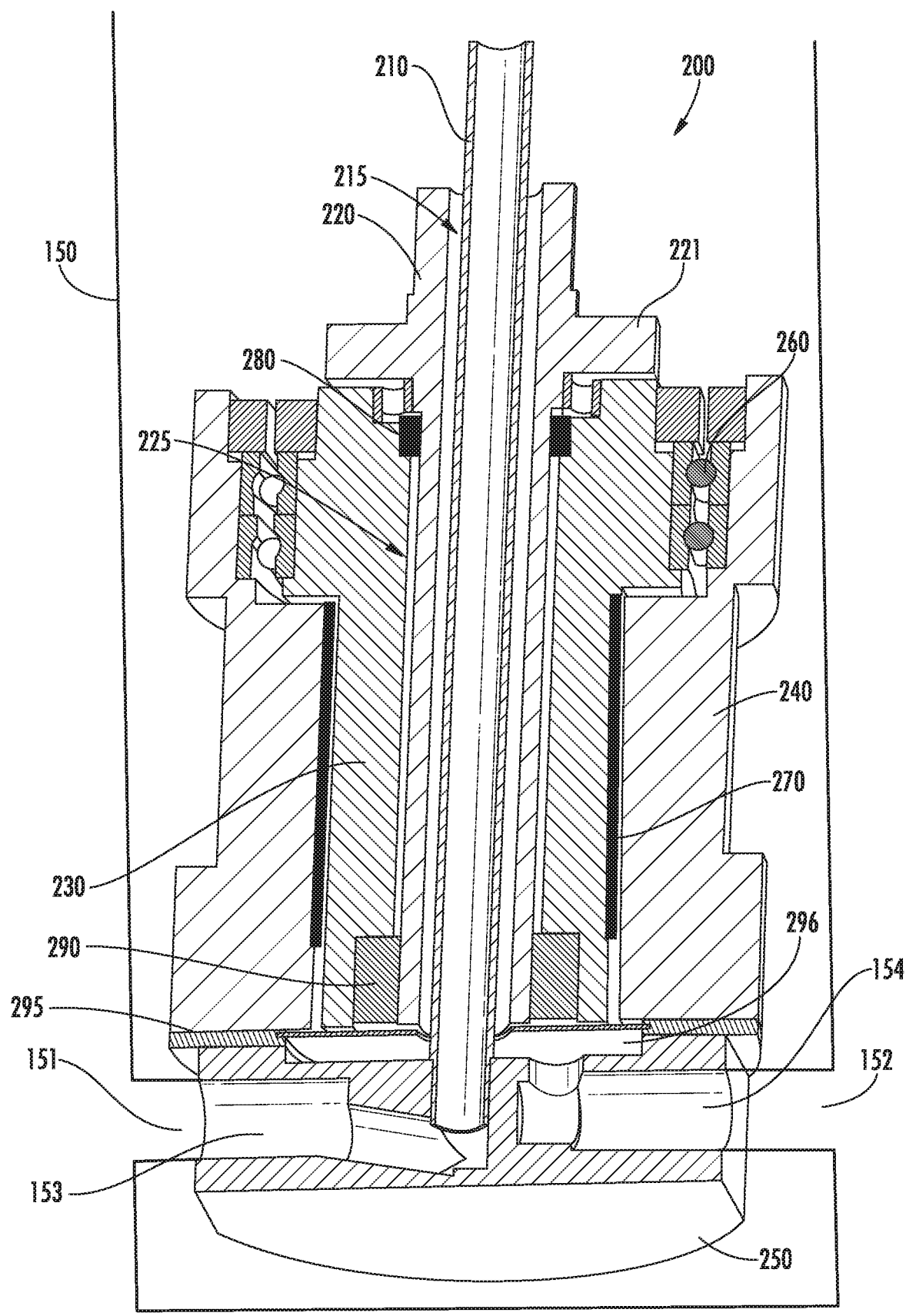
FIG. 2 shows a first embodiment of the rotary union disposed in the isolation box.

A cross section of the isolation box 150 and the rotary union 200 are shown in more detail in FIG. 2. The rotary union 200 serves to provide fixed connections for the inlet 151 and outlet 152, while allows the shafts within the isolation box 150 to rotate. The rotary union 200 has three rotating shafts; a lower hollow inner shaft 210, a lower intermediate shaft 220 and a lower outer shaft 230. These three shafts are concentric. In some embodiments, the lower hollow inner shaft 210 and the upper inner shaft 160 may be a unitary component. In certain embodiments, the lower intermediate shaft 220 comprises a flange 221 near its upper end. This flange 221 allows attachment of the lower intermediate shaft 220 to the upper intermediate shaft 170.

This disclosure uses the terms "upper" and "lower" to distinguish between the rotating shaft assembly disposed near the process chamber 100 and the rotating shaft assembly disposed near the isolation box 150. However, the rotating shaft assemblies do not have to be oriented in this manner. For example, the shafts may be aligned in the horizontal direction rather than a vertical direction. Thus, the term "upper" refers to the components located proximate the process chamber 100, while the term "lower" refers to components proximate the isolation box 150.

The lower hollow inner shaft 210 and the lower intermediate shaft 220 are separated by a channel 215 in the form of an annular cylinder. The channel 215 and the channel 165 may be in fluid communication and sealed together to form a single passageway. The dimensions of the channel 215 and channel 165 may be selected so that the hydraulic diameter defined by the size of these annular channels is roughly equal to the hydraulic diameter of the inner diameter of the lower hollow inner shaft 210. The lower hollow inner shaft 210 and the lower intermediate shaft 220 are in communication with a base 250. This base 250 contains inlet conduit 153 and outlet conduit 154 which are in communication with inlet 151 and outlet 152, respectively. The base 250 is stationary within the isolation box 150. In operation, cryogenic fluid flows through the inlet 151 and into an inlet conduit 153 in the base 250. This inlet conduit 153 is in communication with the lower hollow inner shaft 210. The cryogenic fluid then passes through the upper inner shaft 160 and through the conduit 113 in the platen 110, as shown in FIG. 1, before returning through the channels 165, 215. The channel 215 is in communication with the outlet conduit 154 and the outlet 152.

The lower hollow inner shaft 210 rotates within base 250. Consequently, there may be a slight gap between these components to allow for this rotation. To prevent galling, wear and friction between the two components, a bushing, such as a plastic bushing, and more specifically a Teflon type plastic which is capable of withstanding cryogenic temperatures, may be utilized. Since there is a small gap between lower hollow inner shaft 210 and base 250, there may be a resulting leakage path from inlet conduit 153 to outlet conduit 154. Consequently, cryogenic fluid may leak from inlet conduit 153 to outlet conduit 154. This leakage is internal to the rotary union 200, so its only impact is to the efficiency of the rotary union 200.

The lower intermediate shaft 220 terminates in a cavity 296 at the top of the base 250, defined by the base 250, insulator 295 and outer surface of the lower hollow inner shaft 210. This cavity 296 is sealed from the vacuum environment of the isolation box 150 by the heated ferrofluid seal 270.

Since the cryogenic fluid contacts both the lower hollow inner shaft 210 and the lower intermediate shaft 220, both of these components will be at roughly the same temperature as the cryogenic fluid. A lower outer shaft 230 surrounds at least a portion of the lower intermediate shaft 220. This lower outer shaft 230 is spaced apart from the lower intermediate shaft 220 by a gap 225. In certain embodiments, the lower outer shaft 230 is disposed entirely within the isolation box 150. In certain embodiments, this gap 225 is maintained at near vacuum conditions, such as less than 50 millitorr. A support 280 holds the lower outer shaft 230 in place and also allows the atmosphere in the gap 225 to be at the same pressure as the isolation box 150. The support 280 may be made of an insulating material, such as a plastic material, including Teflon and PEEK, or a ceramic material, including alumina. This gap 225 reduces the transfer of heat from the lower outer shaft 230 to the lower intermediate shaft 220. Thus, the lower outer shaft 230 may be at a higher temperature than the lower intermediate shaft 220. In certain embodiments, the gap 225 may be about 0.125 inches thick, although other dimensions may be used. In certain embodiments, the lower intermediate shaft 220 may be at −170° C. while the lower outer shaft 230 is at approximately 0° C.

Each of these rotating shafts may be constructed of stainless steel, or another suitable material.

A lower housing 240, which remains stationary, surrounds at least a portion of the lower outer shaft 230. In certain embodiments, bearings 260 are disposed between the lower housing 240 and the lower outer shaft 230 and may be used to facilitate the rotation of the lower outer shaft 230 relative to the lower housing 240.

A heated ferrofluid seal 270 is created between the lower housing 240 and the lower outer shaft 230. The heated ferrofluid seal 270 creates a seal so as to separate the vacuum conditions that exist within the isolation box 150 from the cryogenic fluid in cavity 296. The heated ferrofluid seal 270 will be described in more detail below.

Ferrofluid and bearings preferably operate at temperatures greater than about −40° C. The cryogenic fluid may be maintained at temperatures as low as −170° C.

The lower intermediate shaft 220 and the lower outer shaft 230 are held together by a static seal. In the embodiment of FIG. 2, the static seal comprises a ceramic ring 290 that is brazed to both shafts. The ceramic ring 290 has low thermal conductivity and therefore helps maintain the temperature differential between the lower intermediate shaft 220 and the lower outer shaft 230. The ceramic ring 290 also provides a hermetic seal between the two rotating shafts. The hermetic seal is employed to insure that cryogenic fluid does not penetrate the gap 225. In certain embodiments, as described above, a support 280 may be disposed at the opposite end of the lower outer shaft 230 to maintain alignment between the lower intermediate shaft 220 and the lower outer shaft 230. In certain embodiments, this support 280 does not create a seal, so that the vacuum conditions within the isolation box 150 also exist in the gap 225.

An insulator 295, which may in the form of an annular ring and have two different heights, may be disposed against the lower end of the rotary union 200 to thermally insulate the lower outer shaft 230 from the exiting cryogenic fluid. Specifically, the shorter inner portion of the insulator may be disposed against the bottom surface of the lower intermediate shaft 220 and the bottom surface of the lower outer shaft 230. The taller outer portion of the insulator 295 may be disposed between the lower housing 240 and the base 250. Because the taller outer portion of the insulator 295 is sandwiched between the base 250 and the lower housing 240, it remains stationary and does not rotate with the rotary union.

In operation, returning cryogenic fluid flows into a cavity 296 defined by the outer surface of the lower hollow inner shaft 210, the top surface of the base 250, and insulator 295. Insulator 295 serves two purposes:
1) to thermally isolate the base 250 from the lower outer shaft 230; and
2) to limit thermal heat transfer via convection from the flowing cryogenic fluid from channel 215 to outlet conduit 154 to lower outer shaft 230.

Figure 3:
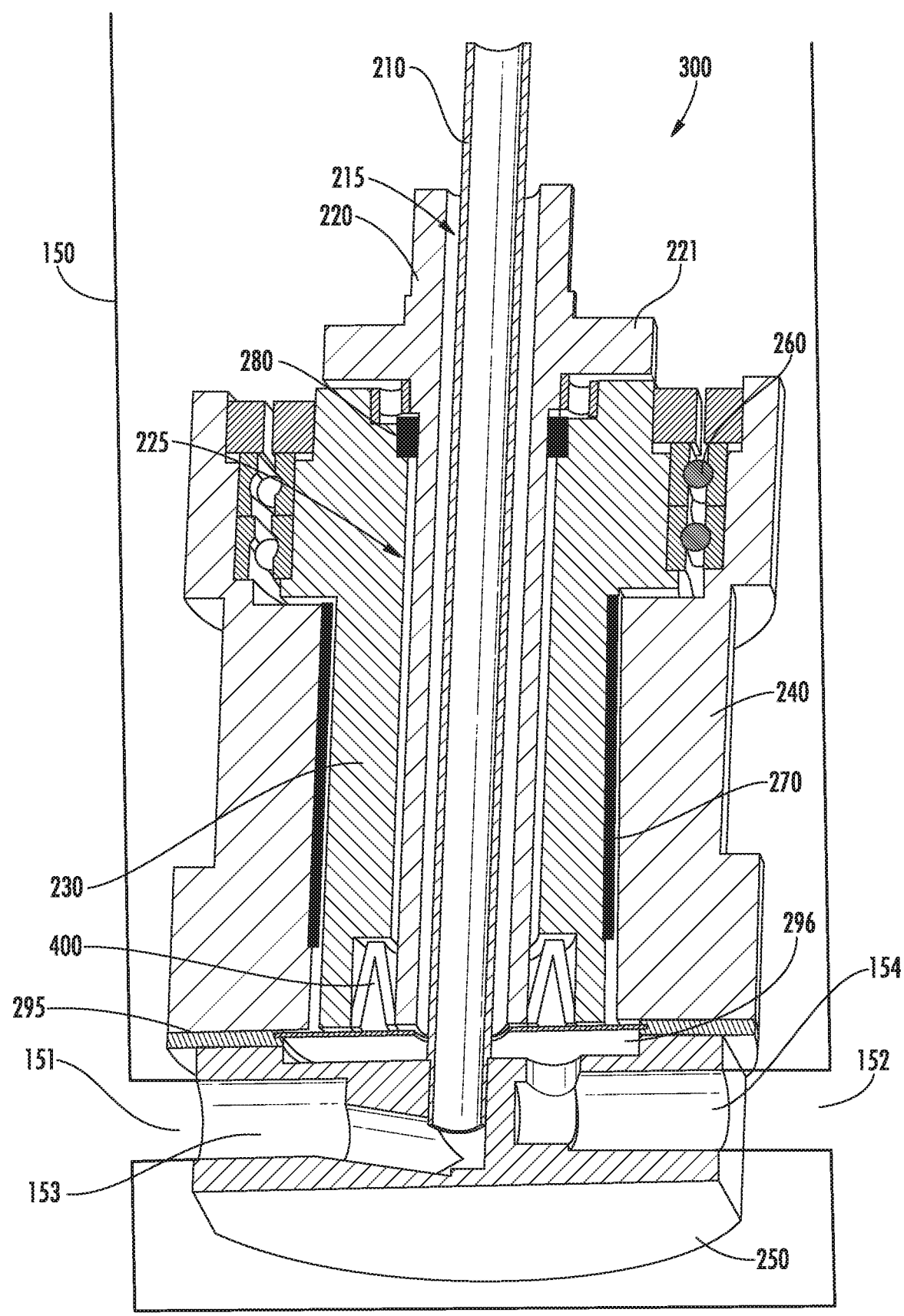
FIG. 3 shows a second embodiment of the rotary union disposed in the isolation box.

FIG. 3 shows a second embodiment of the rotary union 300 disposed in the isolation box 150. Components that are identical to FIG. 2 have been given the same reference designators. The embodiment of FIG. 3 differs from the embodiment of FIG. 2 in the manner in which the lower intermediate shaft 220 is affixed to the lower outer shaft 230. In this embodiment, the static seal comprises a bellows 400, which may be constructed of stainless steel, that is used to affix the lower intermediate shaft 220 to the lower outer shaft 230. The bellows 400 may be a very thin stainless steel web, such as between about 0.005 to 0.020 inches, that limits thermal conduction but still functions as a hermetic gas barrier.

Thus, in the embodiments of FIG. 2 and FIG. 3, the static seal performs two functions. First, it serves to minimize thermal conduction between the lower intermediate shaft 220 and the lower outer shaft 230. Second, it serves to create a hermetic seal between the lower intermediate shaft 220 and the lower outer shaft 230 so that the gap 225 is isolated from the cryogenic fluid in the cavity 296.

Figure 4:
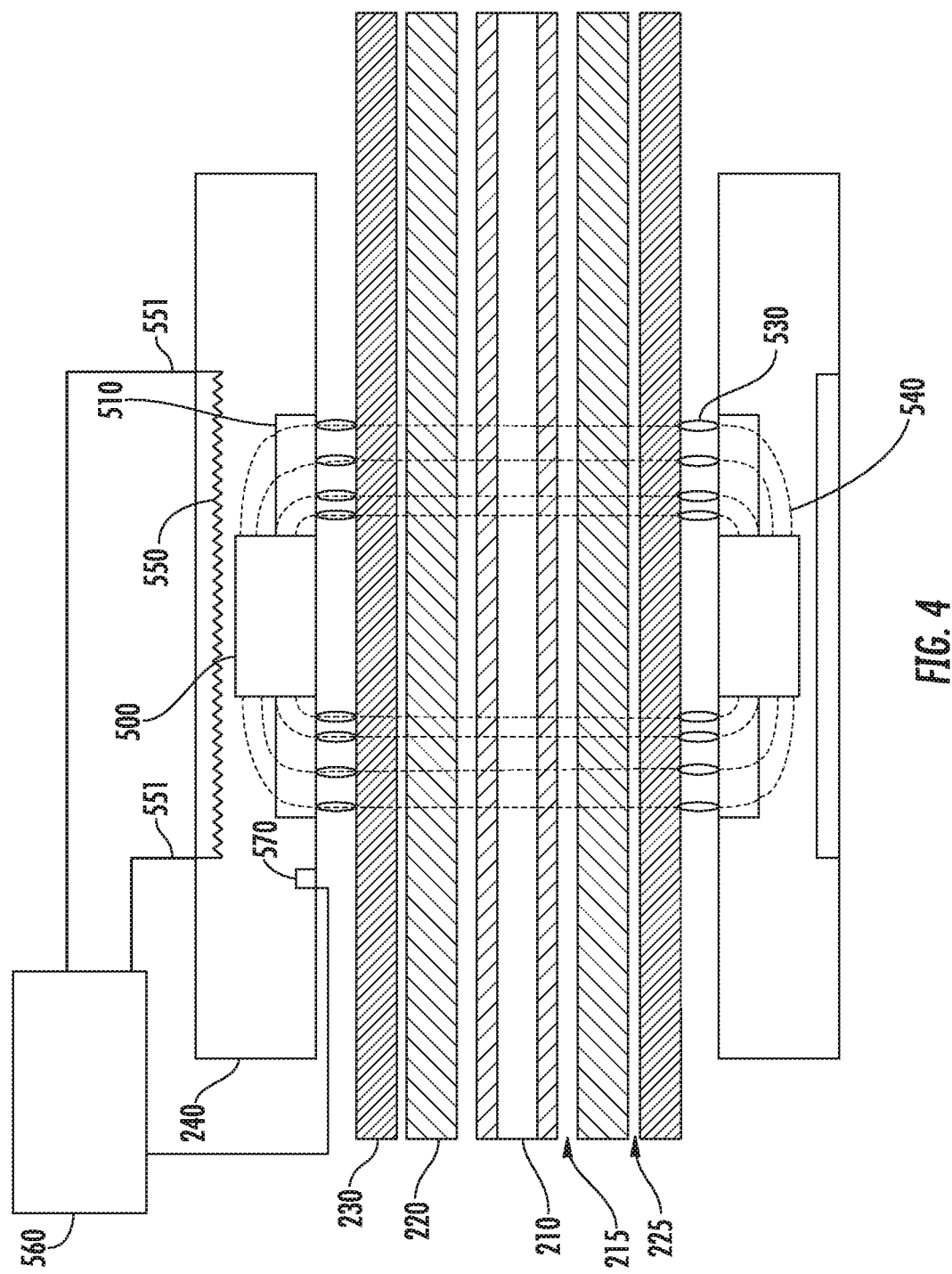
FIG. 4 shows an enlarged view of the heated ferrofluid seal according to one embodiment.

FIG. 4 shows an expanded view of the heated ferrofluid seal 270 shown in FIGS. 2 and 3. A magnet 500 may be disposed in the lower housing 240. The magnet 500 may be annular so as to surround the lower outer shaft 230. On either side of the magnet may be one or more pole pieces 510. The pole pieces 510 serve to direct the magnetic fields 540 in a desired orientation. The magnetic fields 540 may be manipulated so as to be perpendicular to the longer dimension of the rotating shafts (i.e. perpendicular to the axis of rotation). Ferrofluid 530 is disposed in the gap between the lower housing 240 and the lower outer shaft 230. Because of the magnetic field 540, the ferrofluid 530 remains in place and is unaffected by the pressure differential across the ferrofluid 530.

A heater may be disposed within or proximate the lower housing 240.

In one embodiment, as shown in FIG. 4, the heater 550 may be a resistive element that generates heat when an electrical current is passed therethrough. The resistive element may be disposed within the lower housing 240, as shown in FIG. 4, or may be disposed outside the lower housing 240, such as on the outer surface of the lower housing 240. Electrical wires 551 may pass through the isolation box 150 to electrically connect to the resistive element. In certain embodiments, the heater 550 is controlled by a controller 560, which provides a current to the heater 550 through the electrical wires 551. In certain embodiments, the heater 550 may be part of a closed loop system where the controller 560 receives temperature information from a temperature sensor 570, located proximate the ferrofluid 530. In another embodiment, the temperature sensor 570 may be located in a different location to provide the controller 560 with a temperature that may be representative of the temperature of the ferrofluid 530. In another embodiment, the controller 560 may utilize an algorithm based on time or other criteria to control the heater 550 using open loop control.

Figure 5:
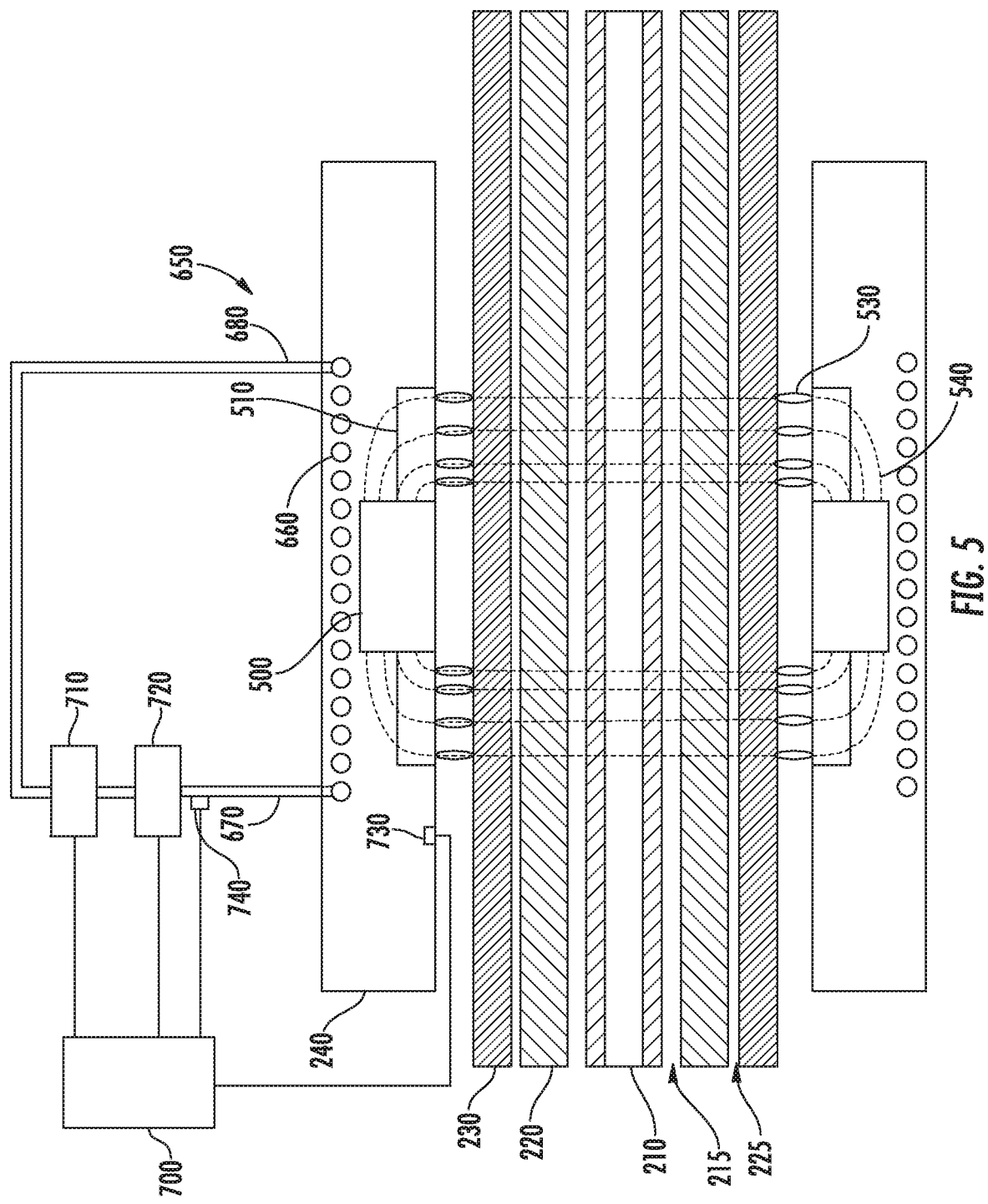
FIG. 5 shows an enlarged view of the heated ferrofluid seal according to a second embodiment.

In another embodiment, shown in FIG. 5, the heater 650 may be constructed by disposing one or more heating channels 660 within the lower housing 240 through which a heated fluid, such as a liquid or gas, is passed. In this embodiment, a heated fluid inlet 670 and a heated fluid outlet 680 may be disposed in the isolation box 150 to allow the source and sink of the heated fluid to pass into and out of the isolation box 150. In certain embodiments, the heater 650 is controlled by a controller 700, which provides a heated fluid to the heated fluid inlet 670. For example, the controller 700 may be in communication with a pump 710, and a fluid heater 720. In certain embodiments, the controller 700 may adjust the temperature of the heated fluid by controlling the fluid heater 720. In certain embodiments, the controller may adjust the temperature of the lower housing 240 by modifying the flow rate of the heated fluid using the pump 710. In certain embodiments, the controller 700 controls both the flow rate and the temperature of the heated fluid. In certain embodiments, the controller 700 may utilize a closed loop system, where the controller 700 received temperature information from a temperature sensor 730 regarding the temperature of the ferrofluid 530. In other embodiments, the temperature sensor 730 may be located in a different location to provide the controller 700 with a temperature that may be representative of the temperature of the ferrofluid 530. In certain embodiments, the controller 700 may also be in communication with a fluid sensor 740 to determine a temperature of the heated fluid. In certain embodiments, the controller 700 may adjust the pump 710 and the fluid heater 720 based on the outputs from at least one of the two temperature sensors. In other embodiments, the controller 700 may utilize open loop control.

In each of these embodiments, the heater serves to warm the lower housing 240 such that the ferrofluid is at a temperature greater than −40° C.

In summary, the present disclosure describes a rotary union that utilizes a heated ferrofluid seal 270. To allow the ferrofluid 530 to be disposed at an acceptable temperature, the present rotary union utilizes three shafts that rotate as one. The lower hollow inner shaft 210 is hollow, allowing the cryogenic fluid to travel through the center of the inner rotating shaft. The lower intermediate shaft 220 is spaced apart from the lower hollow inner shaft 210 so as to create a channel 215 between these two shafts. The channel 215 serves as a return path for the cryogenic fluid. A third rotating shaft, the lower outer shaft 230, then surrounds the lower intermediate shaft 220 and is separated from the lower intermediate shaft 220 by a gap 225. In certain embodiments, the gap 225 is maintained at near vacuum conditions, which reduces the transfer of heat across the gap 225, thus allowing the lower outer shaft 230 to be at a higher temperature than the cryogenic fluid. A heater is used to further increase the temperature of the ferrofluid 530.

The system described herein have many advantages. First, using a rotary union with a cryogenic fluid is challenging because it is difficult to seal the inlet and outlet from an external environment. This is made even more difficult when the external environment is maintained at near vacuum conditions. Ferrofluid seals are able to provide seals between atmospheric pressure and vacuum, but cannot operate at very low temperatures. The present system provides a system where the ferrofluid seal is heated and can be maintained at operating temperatures within the rotary union. This rotary union with a heated ferrofluid seal allows various applications which were difficult or not previously possible. For example, cryogenic fluid can be supplied to a rotating platen within a process chamber without any leakage of cryogenic fluid.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A rotary union for carrying a cryogenic fluid, comprising:
    a hollow inner rotating shaft;
    an intermediate rotating shaft surrounding the hollow inner rotating shaft, where a channel is created in a space between the hollow inner rotating shaft and the intermediate rotating shaft;
    an outer rotating shaft surrounding the intermediate rotating shaft, and separated from the intermediate rotating shaft by a gap;
    a housing surrounding the outer rotating shaft;
    a ferrofluid seal disposed between the outer rotating shaft and the housing; and
    a heater proximate the housing to warm the ferrofluid seal;
    wherein the hollow inner rotating shaft, the intermediate rotating shaft and the outer rotating shaft rotate about a common axis.

2. The rotary union of claim 1, comprising a static seal between the intermediate rotating shaft and the outer rotating shaft.

3. The rotary union of claim 2, wherein the static seal hermetically seals the intermediate rotating shaft and the outer rotating shaft.

4. The rotary union of claim 2, wherein the static seal comprises a ceramic ring that is brazed to the outer rotating shaft and the intermediate rotating shaft.

5. The rotary union of claim 2, wherein the static seal comprises a bellows.

6. The rotary union of claim 1, wherein the heater comprises a resistive element.

7. The rotary union of claim 1, wherein a heating channel is disposed within the housing and wherein a heated fluid passes through the heating channel, wherein the heating channel and the heated fluid comprise the heater.

8. The rotary union of claim 1, wherein the rotary union is disposed in an isolation box, maintained at near vacuum conditions, and wherein the gap is maintained at the near vacuum conditions.

9. A workpiece processing system, comprising:
    a process chamber, maintained at near vacuum conditions;
    a rotating platen within the process chamber, on which a workpiece is disposed;
    a rotating shaft assembly having an upper hollow inner shaft and return path for cryogenic fluid, wherein the upper hollow inner shaft and the return path are in communication with a conduit in the rotating platen;
    an isolation box having an inlet and an outlet and maintained at near vacuum conditions;
    a rotary union disposed within the isolation box, the rotary union comprising:
        a lower hollow inner shaft to deliver cryogenic fluid to the rotating platen; and
        a lower intermediate shaft spaced apart from the lower hollow inner shaft defining a channel therebetween that is in communication with the return path;
    a base disposed in the isolation box, having an inlet conduit in communication with the inlet and the lower hollow inner shaft, and an outlet conduit in communication with the outlet and the channel, wherein the lower hollow inner shaft and the lower intermediate shaft rotate with respect to the base; and
    a heated ferrofluid seal to isolate the outlet conduit from the near vacuum conditions within the isolation box.

10. The workpiece processing system of claim 9, wherein the rotary union further comprises a lower outer shaft spaced apart from the lower intermediate shaft by a gap, wherein the gap is hermetically sealed proximate the base so that the gap is maintained at near vacuum conditions.

11. The workpiece processing system of claim 10, further comprising a lower housing surrounding the lower outer shaft, wherein the lower housing is stationary and the heated ferrofluid seal is disposed between the lower outer shaft and the lower housing.

12. The workpiece processing system of claim 11, wherein a resistive heater is disposed proximate the lower housing.

13. The workpiece processing system of claim 11, wherein a heating channel is disposed in the lower housing through which a heated fluid passes.

14. The workpiece processing system of claim 9, wherein the upper hollow inner shaft and the lower hollow inner shaft comprise one shaft.

15. A rotary union for carrying a cryogenic fluid, comprising:
    a hollow inner rotating shaft;
    an intermediate rotating shaft surrounding the hollow inner rotating shaft, where a channel is created in a space between the hollow inner rotating shaft and the intermediate rotating shaft, where the channel terminates in a cavity;

an outer rotating shaft surrounding the intermediate rotating shaft, and separated from the intermediate rotating shaft by a gap;

a static seal to hermetically seal the gap from the cavity;

a housing surrounding the outer rotating shaft;

a ferrofluid seal disposed between the outer rotating shaft and the housing to seal the cavity;

a heater proximate the housing to warm the ferrofluid seal;

a base, having an inlet conduit in communication with the hollow inner rotating shaft, and an outlet conduit in communication with the cavity; and wherein the hollow inner rotating shaft, the intermediate rotating shaft and the outer rotating shaft rotate with respect to the base.

16. The rotary union of claim 15, wherein an insulator is disposed against a bottom surface of the intermediate rotating shaft, a bottom surface of the outer rotating shaft, and a bottom surface of the housing, and is disposed between the housing and the base.

17. The rotary union of claim 15, wherein the static seal comprises a ceramic ring that is brazed to the outer rotating shaft and the intermediate rotating shaft.

18. The rotary union of claim 15, wherein the static seal comprises a bellows.

* * * * *